United States Patent [19]

Christensen et al.

[11] 4,405,667
[45] Sep. 20, 1983

[54] RETORTABLE PACKAGING STRUCTURE

[75] Inventors: Ronald C. Christensen, Oshkosh; Roger P. Genske; Dennis E. Kester, both of Neenah; William F. Ossian, Appleton, all of Wis.

[73] Assignee: American Can Company, Greenwich, Conn.

[21] Appl. No.: 405,716

[22] Filed: Aug. 6, 1982

[51] Int. Cl.[3] .................. B65D 85/72; B65D 65/40; B65D 81/18; B32B 27/08

[52] U.S. Cl. ........................................ 428/35; 206/484; 206/484.2; 206/524.2; 426/113; 426/127; 428/475.5; 428/475.8; 428/476.1; 428/516

[58] Field of Search .................. 428/35, 475.5, 428/475.8, 476.1, 516, 523; 206/484, 484.2, 206/548.2; 426/113, 127

[56] References Cited

U.S. PATENT DOCUMENTS

| | | | |
|---|---|---|---|
| 4,275,119 | 6/1981 | Weiner | 428/35 |
| 4,276,330 | 6/1981 | Stanley et al. | 428/35 |
| 4,303,710 | 12/1981 | Ballard et al. | 428/35 |
| 4,308,084 | 12/1981 | Ohtusuki et al. | 428/35 |
| 4,355,721 | 10/1982 | Knott et al. | 428/35 |
| 4,356,221 | 10/1982 | Anthony et al. | 428/35 |
| 4,357,376 | 11/1982 | Nattinger et al. | 428/35 |
| 4,360,551 | 11/1982 | Guarino et al. | 428/35 |
| 4,364,981 | 12/1982 | Horner et al. | 428/35 |

*Primary Examiner*—William J. Van Balen
*Attorney, Agent, or Firm*—Stuart S. Bowie; Thomas D. Wilhelm

[57] ABSTRACT

A retortable pouch is made without the use of metal foil. The improved heat sealable structure has an inner heat seal layer of linear low density polyethylene. The second, or adjacent layer is a blend of 20% to 80% linear low density polyethylene and 80% to 20% propylene ethylene copolymer. Optional third, fourth and fifth layers are propylene ethylene copolymer. A sixth layer is anhydride modified polypropylene. A seventh layer is nylon, the eighth layer is ethylene vinyl alcohol copolymer and the ninth layer is nylon. The entire multiple layer structure is firmly adhered together so that the layers mutually support each other in the unitary package.

9 Claims, 6 Drawing Figures

RETORTABLE PACKAGING STRUCTURE

BACKGROUND OF THE INVENTION

Heat sealed pouches made from flexible sheet stock are now being used for packaging certain products which are stored under sterile conditions. Typical products packaged and used in this manner are certain foods and medical supplies. The packaging thus used is known generally as a retort pouch.

The first generation of retort pouches included certain adhesives, used for laminating the various layers. The adhesives had some residual monomer moieties after the adhesive was fully cured. These structures were rejected by governmental authorities because of the perceived possibility of migration of toxic monomers into the packaged food product.

In more recent developments, retort pouch structures are made by various methods of adhering the layers to each other by one or more of several extrusion processes. Illustrative of these processes is one taught in United States Patent 4,190,477. In the process described in that patent, biaxially oriented polyester is first adhesively mounted to metal foil on what is to be the outside of the package. This use of adhesive is considered acceptable because the foil serves as an effective barrier to migration of residual monomer, from the adhesive, to the inside of the package. A polypropylene-based heat sealing layer is separately extruded. A primer is applied to the side of the foil opposite the polyester. Finally the sealant layer and the primed foil are extrusion laminated together using an extrusion grade polypropylene-based polymer as the extrusion laminant.

Common to the requirements of retort pouch packaging is the requirement that the filled and sealed package be subjected to sterilizing conditions of relatively high temperature after the pouch is filled with product and sealed. Typical sterilizing conditions range in severity up to about 275° F. with residence times at that temperature of as much as 30 minutes or more. Such conditions impose severe stresses on the packages. Many packaging structures provide excellent protection for the package contents at less severe conditions. For example, relatively simple packaging structures for packaging requiring the ability to withstand boiling water, such as at 212° F. are readily available from several suppliers. When sterilizing conditions are required, however, most of these packages fail to survive the processing. Typically, problems are encountered with excessive weakening or failure of the heat seals about the periphery of the pouch. Also, certain weaknesses or separations may develop between the layers in the multiple layer sheet structure.

In some sterile packaging applications, it is desirable to be able to visibly inspect the product. In these cases, a transparent packaging film is highly desirable, and foil based films are less desirable.

In other packaging applications, it is indeed important that metal foil be specifically excluded from the structure so that the completed package can be penetrated by microwave energy, such as for cooking contained food.

Among those structures which have proven themselves capable of withstanding the sterilizing process, the sealant, or inner layer of the pouch is believed to be, in almost all cases, based on polypropylene, and in some cases, propylene copolymers. While pouches made with the propylene based polymers are functionally capable of surviving the sterilizing process, their sheet structure is relatively brittle and hard. Thus the pouches are somewhat susceptible to cracking and crazing if subjected to rough handling. There are also some limited problems with weakening of interlayer adhesion between the layers. Once the interlayer adhesion is weakened, the pouch is, of course, subject to further damage by limited abusive handling which an unweakened pouch could normally tolerate.

While pouches made with known sheet structures have achieved a limited degree of success, it is desirable to provide an improved sheet structure which is capable of surviving intact the typical sterilizing processes. It is particularly desirable to have a sheet structure with an improved sealant layer structure. In some cases, it is desirable that the sheet structure be transparent. In still other cases, it is specifically important that the sheet structure contain no significant metallic component.

Among the characteristics of the improved sealant layer structure are that it should be less brittle than the propylene-based sealants. It should also survive the sterilizing process with good heat seal strength about the pouch periphery. Also the interlayer adhesion should remain strong enough that the several layers remain intact as a unit and mutually support each other under stress, particularly after the sterilization process.

SUMMARY OF THE INVENTION

It has now been found that certain of these and related objectives are met in a novel multiple layer flexible packaging film structure, herein disclosed. The layers are firmly adhered to each other in face to face contact. The structure includes, in order, a first layer of linear low density polyethylene and a second layer of a blend of 20% to 80% linear low density polyethylene and 80% to 20% propylene ethylene copolymer.

Optionally, there are one or more of third, fourth and fifth layers of propylene ethylene copolymer. A sixth layer is anhydride modified polypropylene, with seventh, eighth and ninth layers of nylon, ethylene vinyl alcohol copolymer, and nylon respectively. In a preferred embodiment, the composition of the second layer is 40% to 60% linear low density polyethylene and 60% to 40% propylene ethylene copolymer.

The structures of this invention may be assembled by a variety of processes, the specific choice of a process depending on the equipments available and the exact polymers chosen. In most cases, the sixth through ninth layers will first be made into a subassembly, and then the balance of the structure added. While the process of assembling the sub-assembly of layers six through nine is not critical, a typical and most economical process is coextrusion of the subassembly structure.

One acceptable process of completing the structure is extrusion laminating the first, second and third layers to a fifth layer, using the fourth layer as the extrusion laminant. Another includes the process of extrusion laminating the first, second and third layers to the sixth layer using the fourth layer as the extrusion laminant. Yet another includes the process of extrusion laminating the first and second layers to the sixth layer using the third layer as the extrusion laminant.

Still another acceptable process includes extrusion laminating the first layer to the sixth layer using the second layer as the extrusion laminant.

In yet another process the first layer is coextrusion laminated to the sixth layer using as the laminant a coextrusion of the second and third layers.

Finally, the process of making the structure may be completed by extrusion coating the first and second layers onto the sixth layer.

DETAILED DESCRIPTION OF THE INVENTION

Figure 1:
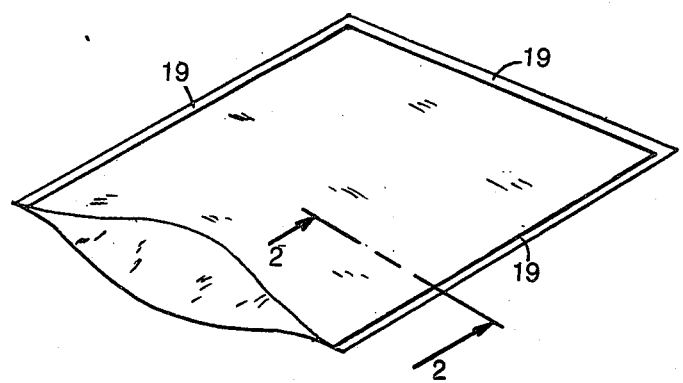
FIG. 1 shows a pouch, sealed on three sides, and made with the sheet structures of this invention.
Figure 2:
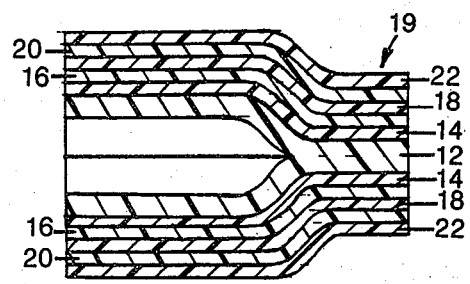
FIG. 2 shows a cross-section of the pouch of FIG. 1 taken at 2—2 of FIG. 1.
Figure 3:
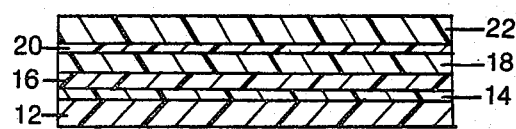
FIG. 3 shows a cross-section of the sheet structure used to make the pouch of FIG. 1.

The invention will now be described in detail and in relation to the drawings. FIG. 1 illustrates a pouch such as is the desired useful packaging structure of this invention. A cross-section of a portion of the pouch is shown in FIG. 2. The sheet material used to make the pouch is seen in FIG. 3. By comparison of FIGS. 2 and 3 it is seen that the FIG. 2 construction consists of two sheet elements of the FIG. 3 construction in face to face relation with the layers 12 joined at the one edge. The pouch is formed by arranging the two sheet elements in face to face relationship and forming heat seals 19 about the common periphery. Alternately, the pouch may be formed by folding a sheet element onto itself and forming heat seals about the edges. Either way, the formed pouch appears as shown in FIG. 1.

Referring now to FIGS. 2 and 3, layer 12 is a heat sealable layer comprised of linear low density polyethylene. Layer 14 is an adhesive, or tie, layer and is a blend of linear low density polyethylene and propylene ethylene copolymer. Layer 16 is also an adhesive, or tie, layer and is an anhydride modified polypropylene. Layers 18 and 22 are nylon. Layer 20 is an ethylene vinyl alcohol copolymer. The formed pouch structure thus has an inner heat seal layer of linear low density polyethylene and an outer surface of nylon. The intermediate layers serve the functions of strengthening the structure, providing certain barrier properties, and bonding the structure together.

The formed pouch is intended for packaging products which will be subjected to a sterilizing process after the product is in the package and the package is sealed. A common sterilizing process is known as autoclave, or retort, processing. In this process, closed and sealed packages are placed in a pressure vessel. Steam and water are then introduced into the vessel at about 275° F. at a sufficiently high pressure to permit maintenance of the desired temperature. The temperature and pressure are usually maintained for about 30 minutes. Finally, the pressure vessel and product are cooled at the same process pressure, after which the pressure is released and the processed packages are removed.

In the pouch structure, the heat seal layer 12 significantly influences the physical properties of the pouch because there is physically more material in layer 12 than in any other single layer. The composition of layer 12 may be any of the polymers or copolymers known as linear low density polyethylene. These polymers are relatively extensible and elastic in nature, giving the pouch a degree of resilience in absorbing physical abuse.

Layer 14 is a blend of 80% to 20% propylene ethylene copolymer and 20% to 80% linear low density polyethylene. A preferred blend is 60% to 40% propylene ethylene copolymer and 40% to 60% linear low density polyethylene. The blend of layer 14 serves as a tie layer to bond layer 12 to the remainder of the structure.

Layer 16 is an anhydride modified polypropylene. Two preferred materials, which are modified with maleic anhydride, are available from Mitsui Company of Japan as Admer QF500 and Admer QF500X.

The nylons in layers 18 and 22 usually are the same composition, although the user may satisfactorily choose to use different nylon polymers. Preferred nylon compositions are nylon 6 and blends of nylon 6 with nylon 12. In the blends, no more than 50% of the composition may be nylon 12, since concentrations over this amount yield pouches susceptible to failing abuse testing after retort processing.

Layers 18 and 22 provide, as their primary function, abuse resistance. Since nylon polymers can absorb a lot of abuse, they protect the more physically sensitive layers of the pouch structure. Layer 22 is specifically protective of the thin, brittle, and fragile layer 20 of ethylene vinyl alcohol. The combination of layers 18 and 22 serves to encapsulate layer 20 during the extrusion process, and thus provides a degree of thermal protection in that role.

Layer 20 of ethylene vinyl alcohol copolymer provides a barrier to passage of oxygen through the pouch structure. Any of the ethylene vinyl alcohols may be used, so long as at least 90% of the ester units have been hydrolyzed to the alcohol form. While some ethylene vinyl alcohol copolymers may provide an adequate barrier with less than 90% hydrolysis, this normally is not the case, and the composition of layer 20 must be chosen such that the needed barrier is provided. Because the vinyl alcohol is so brittle, it is sometimes desirable to incorporate plasticizing agents into layer 20. And such is entirely acceptable so long as an adequate oxygen barrier property is preserved.

Figure 4:
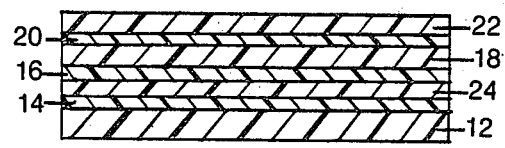
FIGS. 4, 5, and 6 show cross-sections of alternate sheet structures of the invention.

FIG. 4 shows a cross-section of an alternate sheet structure of the invention. The FIG. 4 structure is the same as the FIG. 3 structure except that it incorporates one additional layer 24 of propylene ethylene copolymer between layers 14 and 16. The FIG. 5 structure is the same as the FIG. 3 structure, with the addition of two layers 24 and 26 of propylene ethylene copolymer. Finally, the FIG. 6 structure is the same as the FIG. 3 structure, with the addition of three layers 24, 26, and 28 of propylene ethylene copolymer.

In any given structure where more than one of layers 24, 26 and 28 are used, the compositions of the respective layers may, but normally will not, be the same. For example, in the construction of the FIG. 5 structure, it is convenient to first coextrude two structure subassemblies. The first subassembly includes layers 16, 18, 20 and 22. The second subassembly includes layers 12, 14 and 24. The structure is then fully assembled by joining layers 16 and 24 in an extrusion lamination process using a propylene ethylene copolymer, layer 26, as the extrusion laminant. Thus the process requirements for layer 24, for coextrusion, may differ significantly from the process requirement for layer 26, for extrusion lamination. In accomodation of those process differences, different specific polymers may be selected. Similarly, within the limits of the process requirements, the compositions of layers 24, 26, and 28 may be selected or adjusted in order to improve bond strength with adjacent layers. Thus, for example, the composition of layer 28 may be adjusted to provide improved bonding to layer 16. Or it may be adjusted to accomodate improved bonding to layer 26. Clearly, in structures this complex, a multitude of options are available, and minor adjustments may be made, without departing from the spirit of the invention.

Blend layer 14 is intentionally defined with a broad range of compositions such that the composition for each structure may be tailored for best performance in that particular structure.

The first important parameter to be considered is that the two components of the blend must form a compatible polymeric mixture, which they do. Secondly each of the components of the blend contributes to forming good bonding with the adjacent layer of like polymeric composition. Thus the propylene ethylene copolymer component of the blend contributes the preponderance of the bond forming capability between layer 14 and the adjacent propylene-based layer. Similarly the linear low density polyethylene component of the blend contributes the preponderance of the bond forming capability between layer 14 and layer 12 which is composed of linear low density polyethylene.

In general terms, the preferred composition for layer 14 is 40% to 60% propylene ethylene copolymer and 60% to 40% linear low density polyethylene. Indeed, a composition highly satisfactory for a variety of structures of this invention is 50% propylene ethylene copolymer and 50% linear low density polyethylene. Depending which polymers or copolymers are independently chosen for layers 12, 14, and the adjacent propylene based layer, i.e. 16 or 24, the blend composition may be adjusted for maximum benefit either by adjusting the blend ratio, by selecting an alternate polymer component of propylene ethylene copolymer or of linear low density polyethylene, or by using both techniques. For example, using the general structure of FIG. 3, if the bond between layers 14 and 16 is weaker than desired, the composition of layer 14 may be adjusted. One alternative is to increase the proportion of propylene ethylene copolymer in the layer 14 composition. Another alternative is to choose an alternate specific polymer for use as the propylene ethylene component of the blend.

The above techniques regarding adjusting the layer 14 composition are significant in enabling the best practice of the invention and in obtaining maximum benefit from the packages of the invention. These techniques are, however, only significant regarding maximizing the benefits to be gained from the invention, and are not critical to the basic practice of the invention, which can be satisfactorily practiced with a broad range of compositions of layer 14.

The term propylene ethylene copolymer should herein be interpreted, and is intended to include, copolymers of propylene and ethylene, blends of polypropylene and polyethylene, and combinations of copolymers and blends.

As used in the structure, layers 14, 16, 24, 26, and 28, which have polypropylene-based compositions, do also contain some ethylene. The function of the ethylene is to provide increased resilience to the layers between layer 18 and the sealant layer, and to lend an increased degree of tolerance to bending of the pouch. In general, polypropylene homopolymer layers are susceptible to developing lines of stress weakening when subjected to abuse testing or abusive handling. The ethylene component reduces this susceptibility. It should be noted, however, that not every propylene-based layer need contain ethylene if an adjacent layer does have extensible properties. In that case the adjacent layer may absorb the abuse through the layer interface. Layer 16, for example, is chosen for its bonding properties, and it may or may not contain ethylene. Normally the adjacent layer, such as layer 14 in the FIG. 3 structure, or layer 28 in the FIG. 6 structure will contain ethylene and provide the necessary resilience. However, where possible, at least a minimal ethylene content is desirable. A lower limit of about 2% ethylene is preferred to provide minimal improvements in the layers. A composition of 3.5% ethylene is highly desirable. As the amount of ethylene is increased, the susceptibility to stress weakening is reduced. However, the ethylene content may not be indiscriminantly increased, as other, and undesirable, parameters may emerge. Particularly, polymeric ethylene does not tolerate retort conditions as well as polypropylene, so a preponderance of polypropylene is required for processability. Also a high fraction of polypropylene is necessary for good bonding, such as to layer 16. For most uses, the ethylene content will be relatively low. The specific content for each layer and each structure depends upon the end use anticipated for the final structure.

Another primary element of concern is that the compositions of layers 14, 24, 26, and 28 be selected such that there is good compatibility physically and chemically between the compositions of layers which are joining at a common interface; this to encourage intimate contact and bond development between the respective components of the layers.

The sheet structures of this invention may be made by a variety of processes and combinations of processes. The process and its sequences may be selected according to the equipment and polymers available. The specific structure selected and the layer 14 composition will be at least partially dependent on the process and its sequences.

Using FIG. 3 as an example structure, layers 16, 18, 20 and 22 are coextruded as a four-layer film. Finally the structure is completed by extrusion coating or coextrusion coating layers 14 and 12 onto layer 16. Use of this process imposes certain limitations on the composition of layer 14. While it must bond to layer 16 in the finished structure, a primary concern imposed by the process is that the compositions of layer 12, and particularly, 14 must be coselected to that the processing temperatures and melt flow properties are compatible to extrusion coating, coextrusion and coextrusion coating, as the specific process may require. Particularly regarding layer 14, certain compromises, such as bond strength between layers 14 and 16, may have to be made in its composition, albeit within the ranges of the invention, in order to accomodate the coextrusion and extrusion coating processes.

In another process for making the FIG. 3 structure, layer 12 is extruded as a separate film. Layers 16, 18, 20 and 22 are coextruded as a separate film subassembly of the structure. Layer 12 and the combination of layers 16, 18, 20, and 22 are then simultaneously pulled through a nip from opposite sides and layer 14 is extruded into the nip between layers 12 and 16 in an extrusion lamination process.

In still another process for making the structure of FIG. 3, layers 12 and 14 are coextruded and the combinations of layers 12 and 14, and a coextruded subassembly of layers 16, 18, 20, and 22 are pulled through a hot nip from opposite sides, and a combination of heat and pressure are applied to effect the formation of the bond between layers 14 and 16.

Figure 5:
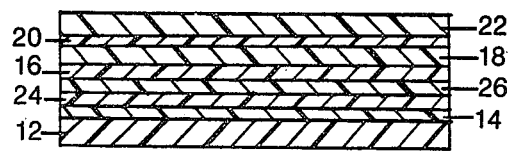
Figure 6:
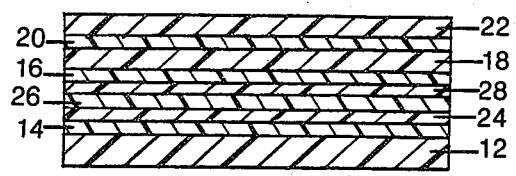

Now that these several exemplary processes for making the structure of FIG. 1 have been described, those skilled in the art will appreciate that the structures illustrated in FIGS. 4, 5, and 6 may likewise be made by similar processes and combinations of processes.

Further to illustrate the processes which may be involved in making the more complex structures, additional process sequences are hereinafter iterated.

First referring to FIG. 6: Layers 28, 16, 18, 20 and 22 are coextruded as a multiple layer subassembly film. Layers 12, 14 and 24 are also coextruded as a separate multiple layer subassembly film. Finally, the two subassemblies are joined in an extrusion lamination process to make the finished assembly, using the layer 26 composition as the extrusion laminant.

Second referring to FIG. 5: Layers 16, 18, 20 and 22 are coextruded as a multiple layer subassembly film. Layers 12, 14, and 24 are coextruded as a separate multiple layer subassembly film. Finally, the two subassemblies are joined in an extrusion lamination process to make the finished assembly, using the layer 26 composition as the extrusion laminant.

Thirdly referring to FIG. 4: Layers 16, 18, 20 and 22 are coextruded as a multiple layer subassembly film. Layers 12 and 14 are coextruded as a separate multiple layer subassembly film. The two subassemblies are joined in an extrusion lamination process to make the finished assembly, using the layer 24 composition as the extrusion laminant.

Having thus described the invention, what is claimed is:

1. A multiple layer flexible packaging structure, wherein the layers are firmly adhered to each other in face to face contact, the structure comprising, in order:
    (a) a first layer of linear low density polyethylene;
    (b) a second layer of a blend of 20% to 80% linear low density polyethylene and 80% to 20% propylene ethylene copolymer;
    (c) optionally, one or more of third, fourth and fifth layers of propylene ethylene copolymer;
    (d) a sixth layer of anhydride modified polypropylene;
    (e) a seventh layer of nylon;
    (f) an eighth layer of ethylene vinyl alcohol copolymer; and
    (g) a ninth layer of nylon.

2. A structure as in claim 1 wherein the composition of said second layer is 40% to 60% linear low density polyethylene and 60% to 40% propylene ethylene copolymer.

3. A structure as in claim 1 made by the process of extrusion laminating said first, second and third layers to a fifth layer, using said fourth layer as the extrusion laminant.

4. A structure as in claim 1 made by the process of extrusion laminating said first, second, third and fourth layers to said sixth layer using said fifth layer as the extrusion laminant.

5. A structure as in claim 1 made by the process of extrusion laminating said first and second layers to said sixth layer using said third layer as the extrusion laminant.

6. A structure as in claim 1 made by the process of extrusion laminating said first layer to said sixth layer using said second layer as the extrusion laminant.

7. A structure as in claim 1 made by the process of coextrusion laminating said first layer to said sixth layer using as the laminant a coextrusion of said second and third layers.

8. A structure as in claim 1 made by the process of extrusion coating said first and second layers onto said sixth layer.

9. A pouch made from the packaging structure of claim 1 or 2.

* * * * *